Nov. 3, 1925.  
C. B. SCHNEIDER  
WHEEL AND SHAFT BOXING  
Filed Dec. 20, 1923
1,560,327
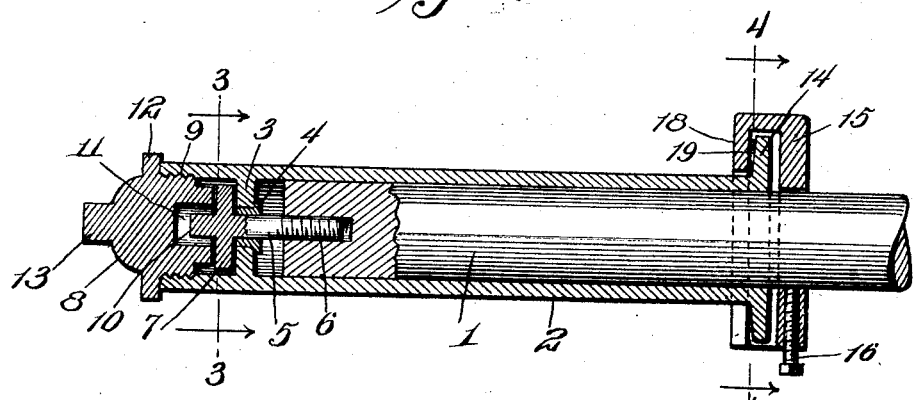
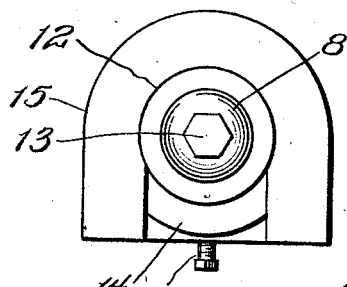 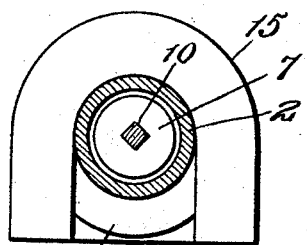
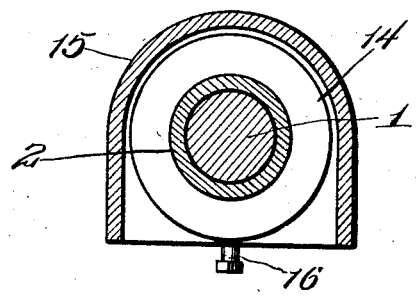
Inventor  
Clarence B. Schneider  
Atty Patented Nov. 3, 1925.

1,560,327

UNITED STATES PATENT OFFICE.

CLARENCE B. SCHNEIDER, OF GARFIELD, WASHINGTON.

WHEEL AND SHAFT BOXING.

Application filed December 20, 1923. Serial No. 681,862.

*To all whom it may concern:*

Be it known that CLARENCE B. SCHNEIDER, a citizen of the United States, residing at Garfield, in the county of Whitman and State of Washington, has invented new and useful Improvements in Wheel and Shaft Boxings, of which the following is a specification.

It is the purpose of the present invention to provide, in a shaft boxing, a construction thereof particularly adapted for farming machinery wherein a side draft is involved, for instance, such as gang plows, binder tongue trucks, and various other similar machines or implements, where a wheel operates partly sidewise or on an angle at all times.

Another purpose is to provide an axle or shaft boxing wherein the friction between the moving parts is reduced to a minimum.

Still another purpose is to provide a shaft or axle boxing which can be constructed at a small cost and sold at a reasonable profit.

A further purpose is to provide a shaft boxing wherein the parts are so constructed and arranged as to preclude foreign matter.

A still further purpose is to provide, in a shaft boxing, a construction including a hub cap which performs two purposes. For instance, it constitutes a grease cup and at the same time withstands side draft wear.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a longitudinal sectional view through the shaft boxing constructed in accordance with the invention.

Figure 2 is an end view.

Figure 3 is a cross sectional view on line 3—3 of Figure 1.

Figure 4 is a sectional view on line 4—4 of Figure 1.

Referring to the drawings, 1 designates an axle or shaft which, in the present instance, may represent the shaft which carries the angularly disposed side draft wheel of a gang plow, although not necessarily, for it may act as one of the shafts of a binder, tongue truck, or similar machine. A boxing 2 is mounted upon the shaft or axle and is designed to carry the hub of the wheel. Provided the axle or shaft constitutes a shaft which supports the angularly disposed side draft wheel of a gang plow, it will assume an angular or inclined position, hence it is the purpose of the present invention to provide the boxing with means to reduce the friction and end thrust to a minimum. To accomplish this result, the boxing near its outer end is provided with an interior division wall 3 in which a suitable bearing bushing 4 is mounted.

A spindle 5 engages through the bearing bushing and is threaded at 6 into the extremity of the main axle or shaft. The spindle has an annular head 7 which operates between the division wall 3 and a hub cap 8 which is threaded at 9 into the end of the boxing 2. The spindle beyond the head 7 has an extension 10 which is rectangular in cross sectional area and is designed for the purpose of being engaged with by means of a wrench whereby the spindle may be adjusted, tightened or removed.

The hub cap 8 is provided with a cavity 11 for the reception of the extension 10. This cavity receives axle grease so that the boxing may rotate freely around the spindle. Axle grease is also deposited between the division wall 3 and the hub cap for the purpose of keeping the parts well lubricated. The hub 7 is circular with a cylindrical surface or edge and is located between the division abutment wall and the hub cap 8, so that the opposed flat faces of the hub 7 may cooperate with a marginal edge of the hub cap and a flat face of the division abutment wall 3, the cavity 11 of the hub cap receiving the axle grease, so that the boxing may rotate freely around the spindle. The hub 7 in cooperating with the wall 3 and a marginal edge of the hub cap constitutes a means for taking care of the end thrust when the boxing moves in one direction and when the shaft moves in the opposite direction. In other words, when the hub 7 contacts with the wall 3, the end thrust is taken care of in one direction and when the hub 7 engages with a marginal edge of the hub cap, it takes care of the end thrust in the opposite direction.

The boxing is of a diameter to engage and operate upon the axle shaft. In fact, the only frictionally engaging parts are the boxing on the shaft or axle and the hub cap against the annular head which, in turn, operates against the division wall. The hub cap has an annular flange 12 which tightens against the marginal end edge of the boxing. The hub cap has an external head 13 rectangular in cross sectional area for the reception of a wrench, whereby the hub cap may be applied or removed when assembling or disassembling the parts.

One end of the boxing has an annular flange 14 which operates in a housing 15. The housing is held securely upon the shaft or axle by means of a set-screw or bolt 16 which is threaded through the housing with its end frictionally engaging with the axle shaft. The space or compartment of the housing encloses the flange 14. The housing has a wall 18 which overlies the surface 19 of the flange 14, so as to preclude foreign matter from entering between the boxing and the shaft or axle.

The present construction of boxing will operate upon any size of shaft or axle, therefore the axle boxing is applicable to all farming machinery that is in use as well as machines to be manufactured. The only change to be made to apply the present construction of axle or shaft boxing is to construct a threaded bore in the end of the shaft or axle. When the boxing is well lubricated, the construction is as durable as the average machine and in order to replenish the axle grease or other lubricant, the hub cap may be removed and after the lubricant has been replenished, the cap may be tightened in position.

The invention having been set forth, what is claimed is:

1. A construction of the kind indicated including a shaft and a boxing fitting the journal portion of the shaft, the boxing adjacent one end being provided with an interior division wall having a bearing bushing fitted therein, a spindle threadingly engaged in the extremity of the journal portion of the shaft and extending through the bearing bushing, and a hub cap exteriorly threaded for engagement with the interior threads in the boxing, the spindle being provided with an annular head disposed between the division wall and the inner end of the hub cap to take care of the end thrust in either direction on the shaft.

2. A construction of the kind indicated including a shaft and a boxing fitting the journal portion of the shaft, the boxing adjacent one end being provided with an interior annular division abutment wall having a bearing bushing fitted therein and being spaced a short distance from the end of the shaft, a hub cap threadingly connected within the end of the boxing with a marginal abutment edge spaced from the abutment wall, and a spindle passing through the bearing bushing and being threadingly connected into the end of the shaft, said wall having a flat abutment face, the spindle being provided with a circular hub of substantial size with a cylindrical edge located between the marginal abutment edge and the abutment face of the wall to contact with either and thereby take care of the end thrust in either direction on the shaft.

In testimony whereof he affixes his signature.

CLARENCE B. SCHNEIDER.